United States Patent
Zhuang et al.

(10) Patent No.: US 12,372,441 B2
(45) Date of Patent: Jul. 29, 2025

(54) AUTOMATIC SYSTEM AND METHOD FOR TISSUE SECTIONING, STAINING, AND SCANNING

(71) Applicant: Microvizual, Inc., New York, NY (US)

(72) Inventors: Zhengping Zhuang, Bethesda, MD (US); Anthony Cappadona, Bethesda, MD (US); Young Wan Moon, Seoul (KR)

(73) Assignee: Microvizual, Inc., New York, NY (US)

( * ) Notice: Subject to any disclaimer, the term of this patent is extended or adjusted under 35 U.S.C. 154(b) by 766 days.

(21) Appl. No.: 17/440,368

(22) PCT Filed: Mar. 19, 2020

(86) PCT No.: PCT/US2020/023644
§ 371 (c)(1),
(2) Date: Sep. 17, 2021

(87) PCT Pub. No.: WO2020/191199
PCT Pub. Date: Apr. 24, 2020

(65) Prior Publication Data
US 2022/0349787 A1    Nov. 3, 2022

Related U.S. Application Data

(60) Provisional application No. 62/820,604, filed on Mar. 19, 2019.

(51) Int. Cl.
*G01N 1/31*        (2006.01)
*G01N 1/06*        (2006.01)
(Continued)

(52) U.S. Cl.
CPC ............... *G01N 1/312* (2013.01); *G01N 1/06* (2013.01); *G01N 1/30* (2013.01); *G01N 1/36* (2013.01);
(Continued)

(58) Field of Classification Search
CPC ......... G01N 33/48764; G01N 33/4833; G01N 1/312; G01N 1/06; G01N 1/30;
(Continued)

(56) References Cited

U.S. PATENT DOCUMENTS 3,690,988 A    9/1972  Ullberg
5,156,019 A    10/1992 McCormick
(Continued)

FOREIGN PATENT DOCUMENTS

CA    1232298        2/1988
CA    1232298  A     2/1988
(Continued)

OTHER PUBLICATIONS

Extended European Search Report dated Jan. 27, 2023 issued in EP 20772823.9 (13 pages).
(Continued)

*Primary Examiner* — Christopher L Chin
(74) *Attorney, Agent, or Firm* — Taft Stettinius & Hollister LLP

(57) ABSTRACT

Disclosed is plate or film for collecting and analyzing a sample. The plate or film includes a surface and a plurality of slices from the sample immobilized on the surface. Further, the plurality of slices are cut from the sample with equal thickness, and the plurality of slices are placed on the surface of the plate or film following their cutting order.

19 Claims, 10 Drawing Sheets

(51) Int. Cl.
*G01N 1/30* (2006.01)
*G01N 1/36* (2006.01)
*G01N 35/00* (2006.01)
*H04N 23/60* (2023.01)

(52) U.S. Cl.
CPC . *G01N 35/00009* (2013.01); *G01N 2001/317* (2013.01); *G01N 2001/362* (2013.01); *H04N 23/60* (2023.01)

(58) Field of Classification Search
CPC .............. G01N 1/36; G01N 35/00009; G01N 2001/317; G01N 2001/362; G01N 2035/00019; G01N 1/286; Y10T 436/110833; H04N 23/60
USPC ................... 422/66; 436/44; 435/40.5, 40.52
See application file for complete search history.

(56) References Cited

U.S. PATENT DOCUMENTS

| | | | |
|---|---|---|---|
| 10,473,557 B2* | 11/2019 | Mitra | G01N 1/06 |
| 2003/0039384 A1 | 2/2003 | Bacus et al. | |
| 2007/0039435 A1 | 2/2007 | Kokubo | |
| 2008/0044260 A1* | 2/2008 | Miyatani | G01N 1/4077 414/222.11 |
| 2012/0129251 A1 | 5/2012 | Lin | |
| 2013/0122540 A1* | 5/2013 | Nakazawa | G01N 1/286 435/40.52 |
| 2014/0273088 A1 | 9/2014 | Winther | |
| 2016/0047720 A1 | 2/2016 | Wolgast et al. | |
| 2016/0290895 A1 | 10/2016 | Daniel et al. | |

FOREIGN PATENT DOCUMENTS

| | | |
|---|---|---|
| WO | 2015046419 A1 | 4/2015 |
| WO | 2018094290 A1 | 5/2018 |

OTHER PUBLICATIONS

The International Bureau of WIPO, International Preliminary Report on Patentability issued in corresponding International application No. PCT/US2020/023644, dated Sep. 30, 2021, 13 pp.

United States Patent & Trademark Office, The International Search Report and the Written Opinion Issued in corresponding International application No. PCT/US2020/023644, dated Jul. 24, 2020, 5 pp.

* cited by examiner

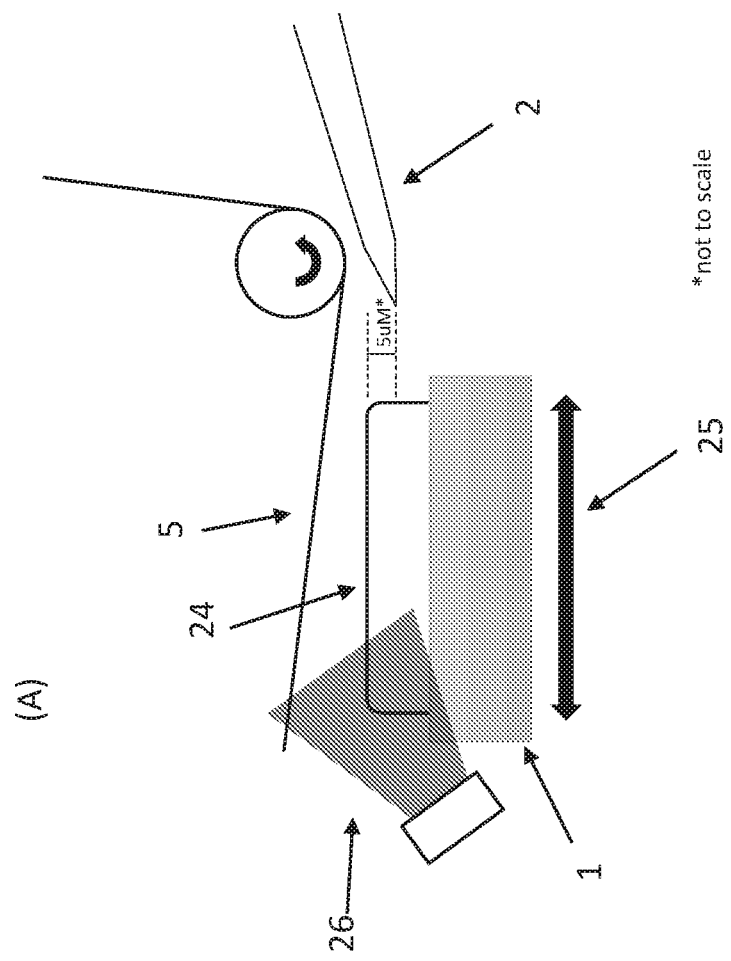
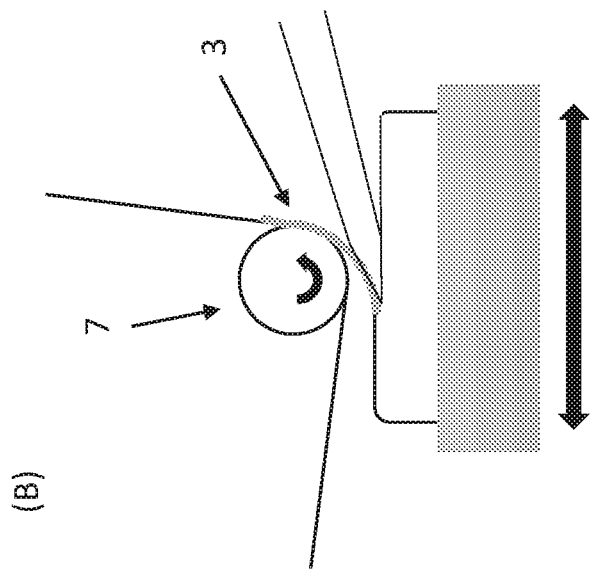
Fig. 2

AUTOMATIC SYSTEM AND METHOD FOR TISSUE SECTIONING, STAINING, AND SCANNING

This application is a national stage application of International Application No. PCT/US2020/023644, filed Mar. 19, 2020, which claims priority to and takes the benefit of U.S. Provisional Patent Application No. 62/820,604 filed on Mar. 19, 2019, the contents of which are herein incorporated by reference.

FIELD OF THE INVENTION

The field of this invention is diagnostic systems and methods. More specifically, it presents systems and methods in the field of clinical pathology to automate processes of sectioning, staining, and imaging histologic specimens as well as to facilitate information analysis and disease diagnosis.

BACKGROUND OF THE INVENTION

The importance of pathology to modern medicine cannot be overemphasized. In cancer treatment for example, precise pathological reading of invasive regions of cancer on a biopsy is a critical step in enabling an effective therapy design. Throughout a history of more than a century, pathology-based evaluations have always been an indispensable part for diagnosing a disease.

Despite of being a traditional approach, the histomorphologic evaluation still relies on examining slides mounted with quality tissue sections. However, preparing good tissue slides suitable for clinical use not only is labor intensive, but also requires skills from a highly trained histological technician. Currently the supply of such qualified technicians is not keeping up with the increasing volume of tissue-based testing. Thus, there is a need to develop new methods, preferably with automation technology, that can minimize some of the tedious tasks required for preparation of tissue slides.

On the other hand, the advent of the digital age, especially aided by nowadays artificial intelligence (AI), spawns a nascent, yet rapid-evolving field called digital pathology. Digital pathology refers to technologies and techniques to capture, store, and interpret information about pathologic specimens with digitally formatted images. Compared to the tradition of working through a light microscope, digital pathology enables viewing images through a computer interface and transmission of tissue images through internet. Leveraging digital pathology's rapid development, the field of AI explores so-called cognitive technologies that can simulate human reasoning and perceptual abilities for analyzing medical imaging to improve disease prediction and diagnosis. While digital pathology transforms static images into retrievable data, facilitating the acquisition of increasing amounts of information from histologic specimens, the field of AI promises to advance subsequent qualitative and quantitative analyses of that information.

As digital pathology grows hand-in-hand with the AI technology, it calls for increasingly insatiable amount of data. However, besides the above-mentioned production challenge with quality tissue sections, the current image scanning/acquisition also lags behind. Typical microscope-based reading of pathology images takes times for processing and are not amenable for a high throughput approach. Further, for any given tissue sample, its images, by the current standard, are limited only to 2-D views of several random sections. How to improve upon the current standard to acquire more information from that given tissue sample, more importantly, how to drastically improve on scanning technology to achieve high throughput image acquisition becomes a challenge in the age of AI-focused digital pathology.

A need also exists for a system or method that streamline a process from preparing tissue slides to capturing digital images.

SUMMARY OF THE INVENTION

This invention provides systems and methods that streamline the process from preparing tissue slides to capturing digital images to meet the demand of generating multi-layer 3D images for AI-focused digital pathology. At the same time, it promises to acquire more holistic information from a tissue sample to enhance the coverage of histology areas for better pathology diagnosis.

One aspect of this invention relates to a method of processing a sample. The method includes the steps of: (i) providing a sample and defining a virtual horizontal plane and a virtual vertical axis normal to the plane for the sample; (ii) cutting the sample along the virtual horizontal plane into a plurality of sample slices, in which the cutting is substantially parallel to the virtual horizontal plane, the thickness of the plurality of sample slices is substantially the same, and the plurality of sample slices are sequential along the virtual vertical axis following the cutting order; and (iii) juxtaposing the plurality of sample slices on a support consecutively following the cutting order.

The sample in the above method can be a biological sample. Specifically, the sample can be a tissue, for example, a formalin-fixed, paraffin-embedded (FFPE) tissue.

Also in the above method, the thickness of the plurality of sample slices can be adjustable, whereas the support can be a membrane.

The above method can further include the step of immobilizing the plurality of sample slices on the support.

Another aspect of this invention relates to a method of diagnosing disease in a patient. The method includes the following steps: (i) obtaining a sample of interest from said patient; (ii) performing the above described method; (iii) performing histological processing on the sample; (iv) obtaining imaging data from the sample, and (v) comparing and/or correlating the existing histological data and the imaging data in order to assess the health of said patient.

Yet another aspect of this invention relates to a film for collecting and analyzing a sample. The film has a long and narrow surface and a plurality of slices from the sample immobilized on the surface and aligned along the long edges of the surface. Also, the plurality of slices are cut from the sample with equal thickness, and are juxtaposed on the surface of the film following their cutting order.

The plurality of slices on the surface of the just-described film are processed simultaneously in one or more reactions. The one or more reactions comprise a histological staining, a florescent-based staining, or other staining types.

The described film could be a plastic membrane. Also, the film is optically transparent and heat resistant up to at least 60° C. It also could have a series of holes or notches along a long edge of the surface of the film.

Still another aspect of this invention relates to a device for collecting and processing a sample. The device includes a sample cutter having a blade and a cradle configured to hold a sample. Further, the blade or the cradle is movable to ensure the blade makes a series of cut of the sample into a plurality of slices with equal thickness. The device also includes a collecting film having a long and narrow surface. By its design, the device could be configured to, after the sample cutter makes a slice from the sample, apply a force to the slice to transfer and mount the slice onto the collecting film, and it is also configured to align the plurality of slices along the long edges of the surface and juxtapose the plurality of slices consecutively following their cutting order.

The device could further include a film roller that supplies the collecting film.

Yet another aspect of this invention relates to an apparatus for processing a sample which include a just-described device and one or more sample processing modules. In the apparatus, the sample is a formalin-fixed, paraffin-embedded (FFPE) tissue, and examples of the one or more sample processing modules include a de-paraffinization module, a sealing module, a sample staining module, and a sample imaging module. Preferably, the sample imaging module is configured to capture imaging data of the plurality of slices of the tissue simultaneously.

As for the sealing module, it could provide a sealant droplet to cover the collecting film, or provides a transparent cover for the collecting film.

Yet still another aspect of this invention relates to a device for collecting and processing a sample. The device include a sample cutter, a conveyor belt, and a collecting plate. The sample cutter has a blade and a cradle configured to hold a sample. Either the blade or the cradle can be movable to ensure the blade makes a series of cut of the sample into a plurality of slices with equal thickness.

The above device can be configured to, after the sample cutter makes a slice from the sample, immediately remove the slice by the conveyor belt and afterwards unload and mount the slice onto the collecting plate. Further, the device can be configured to juxtapose the plurality of slices on the collecting plate consecutively following their cutting order.

In one embodiment of the device, the conveyor belt is a conveyor film belt consisting of a layer of film. In this embodiment; the device can further include a film roller which supplies the layer of film.

Still another aspect of this invention relates to an apparatus for processing a sample. The apparatus includes an above-described device and one or more sample processing modules. In the apparatus, the sample can be a formalin-fixed, paraffin-embedded (FETE) tissue, and the one or more sample processing modules can include a de-paraffinization module. Examples of the one or more sample processing modules can also be a plate sealing module, a sample staining module; a histology staining module when the sample is a tissue, or a sample imaging module. The sample imaging module can be configured to capture imaging data of the plurality of slices of the tissue simultaneously. On the other hand; the plate sealing module can provide a sealant droplet to cover the plate, a film to cover the plate, or a transparent cover, e.g., a glass cover, for the plate.

Yet another aspect of this invention relates to an imaging device that includes a plate having a plurality of specimens immobilized on a surface of the plate; a carrier for holding the plate; an image capturing means having an image capturing region, and a moving mechanism for altering the relative positional relationship between the carrier and the image capturing means. In the above imaging device; the image capturing means is configured to simultaneously capture images of every specimen on the plate that falls into the image capturing region; and the imaging device is configured to divide the plate surface into a plurality of the image capturing regions. Moreover, the moving mechanism moves the image capturing means sequentially to the plurality of the image capturing regions so images of the plurality of specimens are captured.

The imaging device can further contains an artificial intelligence unit configured to process the digital output of the imaging device.

Another aspect of this invention relates to a method for processing a biological sample. The method includes: (i) cutting the biological sample into a plurality of slices with equal thickness; (ii) transferring the plurality of slices sequentially onto a collecting film having a long and narrow surface thereby aligning the plurality of slices along the long edges of the surface; (iii) spooling the collecting film to form a roll having an evenly thick space between the rolling layers; (iv) staining the plurality of slices on the rolled collecting film; (v) unwinding the rolled collecting film; and (vi) imaging the plurality of slices on the collecting film. Further, the above imaging is conducted one slice at a time when moving the collecting film through a imaging device and includes the following features: the entire slice is captured in the imaging at once, and the imaging is conducted at a speed of between 10 slices per minute to 60 slices per minute.

In the above-described method, the biological sample can be a FFPE tissue. Also, a device can be configured to perform the above-described method.

The details of the invention are set forth in the drawing and the description below. Other features, objects, and advantages of the invention will be apparent to those persons skilled in the art upon reading the drawing and the description, as well as from the appended claims.

BRIEF DESCRIPTION OF THE DRAWING

FIG. 2 is a diagram depicting the sectioning mechanism. Panel (A) shows the relative positioning and motion of the tissue block to the blade. Panel (B) shows how the sample slice is transferred to the film.

DETAILED DESCRIPTION

Figure 1:
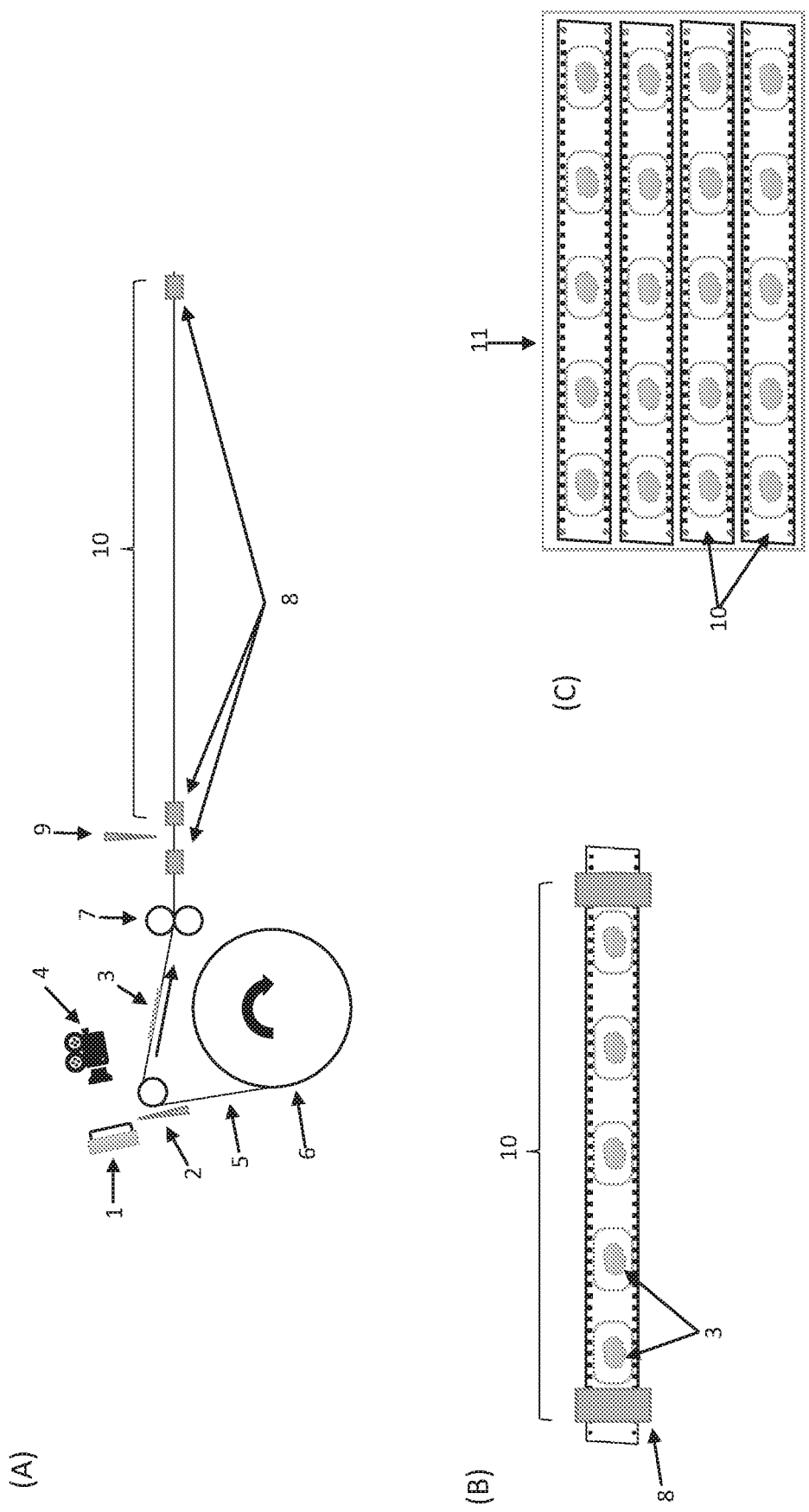
FIG. 1 is a diagram of the sectioning and mounting process in one variant of a high-throughput, reusable-plate design. Panel (A) illustrates sample sectioning and transfer onto a thin film. Panel (B) illustrates a strip of film. Panel (C) depicts multiple strips mounted onto a processing plate.

Methods are provided for acquiring consecutive images of a series of tissue sections. Aspects of the methods include preparing a series of parallel slices of a tissue sample, the thickness of the parallel slices being substantially the same. Also provided are devices and apparatus practicing the subject methods.

Before the present methods or systems are described, it is to be understood that this invention is not limited to particular method described, as such may, of course, vary. Hereinafter, exemplary embodiments of the present invention will be described in detail with reference to the accompanying drawings so that those of ordinary skill in the art can carry out the present invention. However, it should be understood that the present invention can be implemented in various forms and is not intended to limit the exemplary embodiments of the present invention. Also, in the drawings, descriptions of parts unrelated to the detailed description are omitted to clearly describe the present invention.

The subject systems and methods are useful primarily for diagnostic purposes. Yet, the successful implementation of these systems and methods brings a prospect of transforming the practice of pathology, further leap it into a quantitative science.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by, reference to disclose and describe the methods and/or materials in connection with which the publications are cited.

Embodiments of the invention provide advantageous features and characteristics in the areas of the tissue section, the tissue staining, the camera, image identification, and/or automated image analysis, including methods, systems and/or devices of manufacture. Note the terms "determining," "measuring," and "assessing," and "assaying" are used interchangeably and include both quantitative and qualitative determinations.

The sample processed and analyzed by this invention is a biological sample. Specifically, the sample can be any tissue collected via biopsy or dissection that requires histological analysis. The sample is a formal in-fixed, paraffin-embedded (FFPE) tissue sample prior to processing with this invention.

The primary aspects of this invention relate to an integrated method of sample processing comprising: (i) continuous sample sectioning; (ii) transfer of the sample sections onto a support such as a film, and may include subsequent grouping of multiple samples and/or transfer to a processing stage; (iii) deparaffinization via thermal and chemical applications; (iv) tissue staining, such as but not limited to haemotoxylin and eosin (H&E), immunohistochemistry (MC), immunofluorescent-based (IF) staining, or other special staining protocols, applied via batch staining in serial reagent baths or droplet application of reagents; (v) sealant application; (vi) analog image amplification, digital scanning, and image collection/storage; (vii) three-dimensional image stacking and reconstruction; (viii) analysis of processed samples. The just-described method is achieved such that each step may be designed as a module or component of the integrated device, with multiple configurations of the device being able to perform the fundamental aspects of the inventions depending on the specific needs of the user. Multiple and alternate configurations of the present invention are detailed herein.

The invention is designed to carry out standard sectioning protocol utilizing a traditional microtome design comprising a cradle configured to hold a sample and a blade. Traditionally, cradle and sample move such that the paraffin block is forced against the cutting edge of the blade to generate a slice of uniform thickness. Alternatively, the blade may move orthogonal to the motion of the cradle to facilitate slicing; a vibratome can also be incorporated. The thickness of the samples can be adjusted by the user.

A camera may also be incorporated into the design of the microtome. This camera would be positioned normal to and facing the center of the surface of the tissue sample block. The camera is present to aid in quality control. The camera will take a reference picture of the block face prior to each slice. A scale bar or marking of known dimensions would be present on either the cradle or cassette of the sample. The image can be referenced later to aid in alignment and error correction when reconstructing the stack of the scanned images.

The present invention processes the samples continuously and transfers each slice, consecutively and equidistantly, onto a plastic film or tape. The film is positioned near the blade such that the slice will contact the film and stick; the film is moving at a velocity consistent with the slice as to minimize wrinkling or tearing of the section during transfer to the film. By design; the net negative change of the plastic film and the net positive charge of FFPE tissue samples aids in the transfer. In addition, the sample block surface and film may be sprayed with an aqueous solution prior to slicing; the cohesion of the water will aid in transfer. A mechanism could be included to apply force to the slice to aid in adherence. The film may also be coated with a chemical layer or adhesive that promotes adherence of tissues sections. The plurality of sample slices are mounted to the film following the cutting order. Microtomy proceeds until the entire or desired thickness of sample is sliced, or, in some cases, until the sample mounting stage is full.

The plastic film, or tape, is stored in a roll or spool and unwound at a rate consistent with the rate of sample slicing. To maintain precise control of the film and the position of the section on the film, the film is designed with a series of equidistantly spaced holes along the lateral edges, down the length of the film. Sprockets are used to transition the film between modules throughout the device. The cogs of these sprockets align with the holes in the film, resulting in precise control of the movement of the film. This is of importance when aligning the samples with a sealant or staining applicator, and, in some variants, while scanning. The film is both optically transparent and heat resistant up to at least 60° C.; this temperature is relevant for deparaffinization.

Design Variants

In one embodiment, the sections are transferred from the film directly on to a mounting plate. The plate stage is controlled via CNC such that sections are transferred to the plate both in order and in defined regions. This plate is an oversized glass or plastic slide designed to hold hundreds of serial sections from a single sample block; however, these numbers can vary depending on the size the sample. Once mounted to the plate, the samples collectively proceed to deparaffinization, staining, sealing and scanning. The plate, with the entirety of a sample mounted to it, is transferred to storage.

In another embodiment, the film is divided into strips each containing a plurality of sections mounted onto it. In this embodiment, the strips can be processed in two ways. In one variant, the strips are transferred to the mounting plate. Pegs in the mounting plate align with the holes in film allowing for discrete placement of the strip(s) onto the plate. Once the plate is filled with strips, a locking mechanism will hold the strips in place. The plate and the attached strips undergo deparaffinization, staining, sealing and scanning, as in the aforementioned embodiment. However, once scanned; the strips can be removed from the plate and stored separately. The plate can then be reused as a mounting stage. Alternatively, rather than transferring the strips to the plate, the strips can proceed directly to deparaffinization, staining, and sealing using alternate processing modules. This version is less conducive to high-throughput analysis and subsequently more relevant for either clinical or research applications. Current clinical protocol processes approximately 5 to 10 serial sections of a given tissue sample; this number of sections can be fit onto one strip. Researches that require non-uniform staining of adjacent sections could utilize an alternate staining module that processes samples along a strip individually and variably, with either H&E, IHC, IF, or SS. In either of these alternative applications, the strips may be returned to the plate for collective imaging.

In yet another embodiment, the film with the mounted samples are transported sequentially through each processing module as one continuous ribbon. Once processed, the sample is rolled into a spool for storage. This embodiment has two variants. The first is a continuous design in which the samples sections are moved along a conveyer belt, in this case the carrier film, between each module. This version would be time consuming as each sample is processed individually. The second design has the carrier film with sections rolled into a processing spiral. This spiral contains the samples as they undergo collective deparaffinization and staining. The spiral is designed such that a space would exist between layers of the film, allowing for liquid reagents to wash each sample section unhindered. The samples would be unwound from the spiral for sealing and scanning, then rerolled into a spool for storage.

Modular Components

The deparaffinization module serves only to melt the paraffin wax by heating the samples; all other liquid reagent washes typically used for deparaffinization, such as ethanol solutions and xylene, can be applied by the staining modules, as those modules are designed for liquid chemical application. The deparaffinization module must heat each sample to approximately 55° C. for up to 10 minutes. The general design can be that of an oven or a heated surface. If using the mounting plate, strips, or processing spiral, the samples could be transferred into an insulated heating compartment via robotic mechanism. If utilizing the continuous ribbon of film, the samples could pass under or through a heated corridor as they move through the device.

As stated, the staining modules serve to apply liquid reagents that complete the deparaffinization processes, as well as stain the tissue sample. Two variations of the staining module can be integrated into the device. The first embodiment of the staining module utilizes a reagent bath design, in which the samples are submerged and incubated in a series of liquid reagents baths, as required for the particular staining protocol. This variant is well suited when combined with the section mounting plate (either with use of the film strips or direct section mounting) and the processing spiral. In this way, samples are stained as a collective, increasing uniformity. The second variant of the staining module can be that of an automated reagent dispenser, in which automated applicators, as pipettes or nozzles, drip the particular reagents on the specific samples. In this embodiment, reagents could be stored in tanks within the module and they could be pumped to the applicators through dedicated tubing as to prevent contamination. Discrete application of specific staining reagents would reduce the volume of reagent required and is essential if adjacent samples require differing stains. A chamber or barrier could be placed around individual samples to prevent sample runoff and cross-contamination. This staining module variant can be integrated into the system for use with 1) the section mounting plate, either with use of the film strips or direct section mounting, 2) individual strips independent of the plate, and 3) the conveyer-belt design of the continuous processing embodiment, for which the reagent bath variant would be impractical.

In all embodiments of the staining module, the method of staining would be designated by the user. Both the reagent bath variant and the automated dispenser variant could be capable of performing 1) standard H&E staining, 2) IHC, 3) IF, and 4) various special staining protocols. The particular regents for each could be loaded into the module manually, and protocols could be indicated by the user via the user interface. Due to the cost of antibodies and non-standard staining reagents, the reagent bath variant is well-suited for standard H&E staining, whereas the other staining protocol may benefit from the more precise application performed by the automated dispenser.

The sealing module serves to apply a transparent cover to the stained samples. This cover is designed to prevent drying and damage to the samples through the processes of scanning and analysis, as well as during storage. One of three varieties of the sealing modules may be integrated into the device, depending on the needs of the user. The first embodiment of the sealing module dispenses a liquid sealant onto each sample. Application of the sealant would be both controlled and of defined volume, a similar method as the auto-dispensing staining module. In certain embodiments of the integrated device, this sealing module variant could be integrated into the staining module. This variant can be used with all embodiments of the present invention. The second and third variants of the sealing module apply primarily to the embodiment of the present invention that utilizes direct mounting of the sections onto the plate. Once the mounting plate and all sections undergo staining; by whichever means, a plastic film coated with an adhesive could be applied over the plate and the samples. Alternatively, the large glass coverslip can be applied to the plate. This last variant of the sealing would be most applicable for users that may require access to the tissue samples, post-processing.

The scanning module serves to capture and store a digital image of all stained tissue samples. One embodiment of this module utilizes a high-resolution digital camera that captures an image of a sample or plurality of sample within the field of view (FOV). For example, for use in the continuous feed variants of the present invention, this high-resolution camera could capture an image of each section sequentially. Alternatively, when using the mounting plate, the camera FOV could capture a region of some or all samples on the plate. If only a specific region is captured, the camera or plate could be built on the CNC scaffold, allowing the camera to capture multiple regions of the plate that would later be stitched together by the reconstruction software. Another embodiment of the scanning module incorporates an array of high-resolution digital cameras; this embodiment is best integrated with the mounting plate variant. The FOV of each camera could capture a region of the mounting plate;

such that each image contains one or a plurality of tissue sections. This variant is designed to reduce the time spent scanning the plate, if the FOV of the camera is limited by the desired resolution. In yet another embodiment of the scanning module, a light projector could be used to illuminate one side of the stained tissue section. As the light passes through the sample, the analog image could be amplified through a series of lenses and captured by a high-resolution, polychromatic, digital detector array. The sensor of the detector array would require a suitably large number of pixels such that the effective resolution remains high after digital conversion and binning. The sensor would also need to be large enough to capture the entirety of the projected and amplified image. This just-described embodiment of the scanning module could be integrated into all embodiments of the present inventions; however, it would be well-suited for the single-ribbon, continuous-processing variants.

Analysis Software

The remaining aspects of the present invention describe the features and functions of the software. The software performs three actions; 1) generate a three-dimensional reconstruction of the tissue sample; 2) differentiate tissue types within the reconstruction, allowing the user to filter certain tissue types from the reconstruction and highlight target tissues within the sample; 3) use AI for machine learning to facilitate disease diagnosis.

Reconstruction is accomplished by first identifying and ordering the individual tissue sections. If image capture is performed consecutively, digital images should be stored in the correct order. If using certain embodiments of the invention, such as the scanning module that captures all samples on the mounting plate, a separate algorithm may be implemented to 1) identify and number each section within the given image, and 2) save a new set of images, each containing only one section. In certain embodiments, a stitching function may be required to first generate a complete image of plate. Once individual images are saved and ordered, a process of quality control and error correction may be implemented. By matching the high-resolution image of the processed tissue samples with the reference images taken just prior to slicing, alterations to relative position, rotation, and morphology can be observed. To aid in this process, a virtual scale or reference marker can be overlaid onto the high-resolution image. Once all images are stacked in order and corrected for errors, the process of reconstruction can begin. The reconstruction algorithm would utilize the known thickness of each cut to interpolate between 2D images and form a 3D model of the processed tissue samples.

Once reconstruction is complete, AI analysis will take place. By observing the staining patterns within the reconstruction and cross-referencing histological image databases of known cell types, both physiologic and pathologic, the AI system will identify and indicate features of the tissue sample including, but not limited to, gross structure both physiologic and pathologic, tissue type and boarders, vascular networks, etc. The software also generates dynamic 3D model of the tissue sample in which certain tissues and structures can be highlighted or removed, depending on the goals of the user.

A user interface, most likely presented in the form of a computer application, will be used to manage the setting of the integrated devices and edit the dynamic 3D reconstruction. Some features that may be controlled by the user include sample thickness, staining protocols, and image resolution. This list is not exhaustive. Users may also be required to indicate which embodiment of the device is in use, including which modules are incorporated.

The present invention is designed to combine all processes of histology into one high-throughput, integrated device. The modular nature of each component allows for great variation in the final design of the system. Determining which variant to use depends on the type of sample being analyzed and methods of analysis, especially which staining protocols. Certain modules described above can be used independently, or, in certain cases, omitted if manual processing is desired; however, the present invention is intended to be developed as an autonomous, integrated system with no or minimal user input.

BEST MODE FOR CARRYING OUT INVENTION

The following examples and figures explains the present invention more concretely but does not limit the range or scope of the present invention.

FIG. 1 depicts diagrams of the sectioning and mounting process in a high-throughput; reusable-plate embodiment of the present invention. As illustrated in panel (A), a formalin-fixed, paraffin-embedded (FFPE) biological tissue sample block 1 is sliced by a microtome blade 2. A camera 4 is present and directed at the block face 24; this captures an image of the block face 24 prior to each cut. This reference image is saved for quality control purposes. The resulting tissue slices 3 are transferred sequentially onto a thin, transparent, heat-resistant mounting film 5. This film 5, originally rolled into a spool 6, is moved through the device using a system of high-precision sprockets 7. In the embodiment of the invention depicted in this figure, the leading length of film 5 may be extended and held taut with the aid of a collection of clamps 8. The length of film 5 collected between these clamps 8 has a plurality of sliced tissue sections 3 mounted onto it; this length of film is referred to as a strip 10 in the context of this invention. This strip 10 is cut by a blade 9. The strip of film 10 is transferred via automated mechanism to an oversized glass slide designed to hold a plurality of strips of film 10, defined as a mounting plate 11. The mounting plate 11 can hold a plurality of strips 10. They are arranged such that the maximum number of strips 10 can be mounted onto the plate 11. The cutting order of the sample block 1 is maintained as well, such that the placement of the sample sections 5 on plate 11 is consecutive from left to right, top to bottom. Once the mounting plate 11 is full, all mounted strips 10 or directly mounted sample sections (not depicted in the embodiment) will undergo sample processing including deparaffinization, staining, sealing, scanning, and analysis. In this embodiment, the strips 10 can be removed and stored separately; the mounting plate 11 can be reused for the next set of strips 10.

FIG. 2 is a diagram depicting the sectioning mechanism. Panel (A) shows the relative positioning of the tissue block 1 to the blade 2. The bevel of the blade is parallel to the sample block face 24, while the cutting edge of the bade is displaced by the desired slice thickness; Sum in this figure (not to scale). The motion of the tissue block 25 is linear and parallel to the block face 24. The film 5 is positioned close to the blade 2 such that the sample slice 3 curls up and contacts the film 5; shown in panel (B). The sprockets 7 controlling the motion of the film 5 ensure that the velocity of the film 5 at the point of transfer is equal to that of the cutting motion 25, such that the sample slice 3 is not torn or damaged during transfer. An aqueous solution 26 can be sprayed onto the film 5 and block face 24 prior to cutting to aid in transfer to the film 5.

Figure 3:
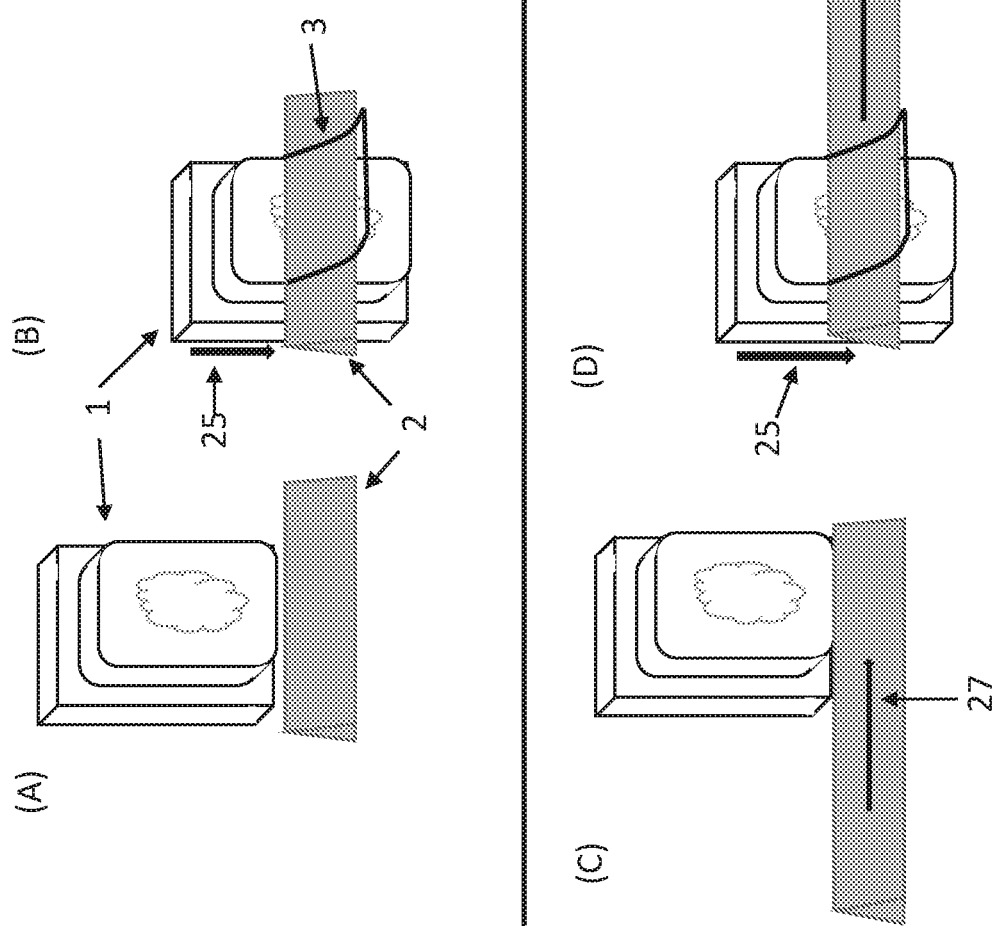
FIG. 3 depicts the motion of the block and blade during sectioning. Panels (A) and (B) depict before and after images of a design in which the blade is stationary. Panels (C) and (D) depict before and after images of a design in which both the block and blade are in motion while cutting.

FIG. 3 depicts the motion of the sample block 25 and blade 27 during sectioning. Panels (A) and (B) depict a design in which the blade 2 is stationary and the block 1 to forced into the cutting edge. Panels (C) and (D) depict a design in which both the block 1 and blade 2 are in motion while cutting. In this case, the cutting edge of the blade translates to the fight 27, relative to the sample, slicing through the sample as the block moves downward 25 into the blade. The direction of motion of the tissue block 25 remains linear and perpendicular to the cutting edge in both cases.

Figure 4:
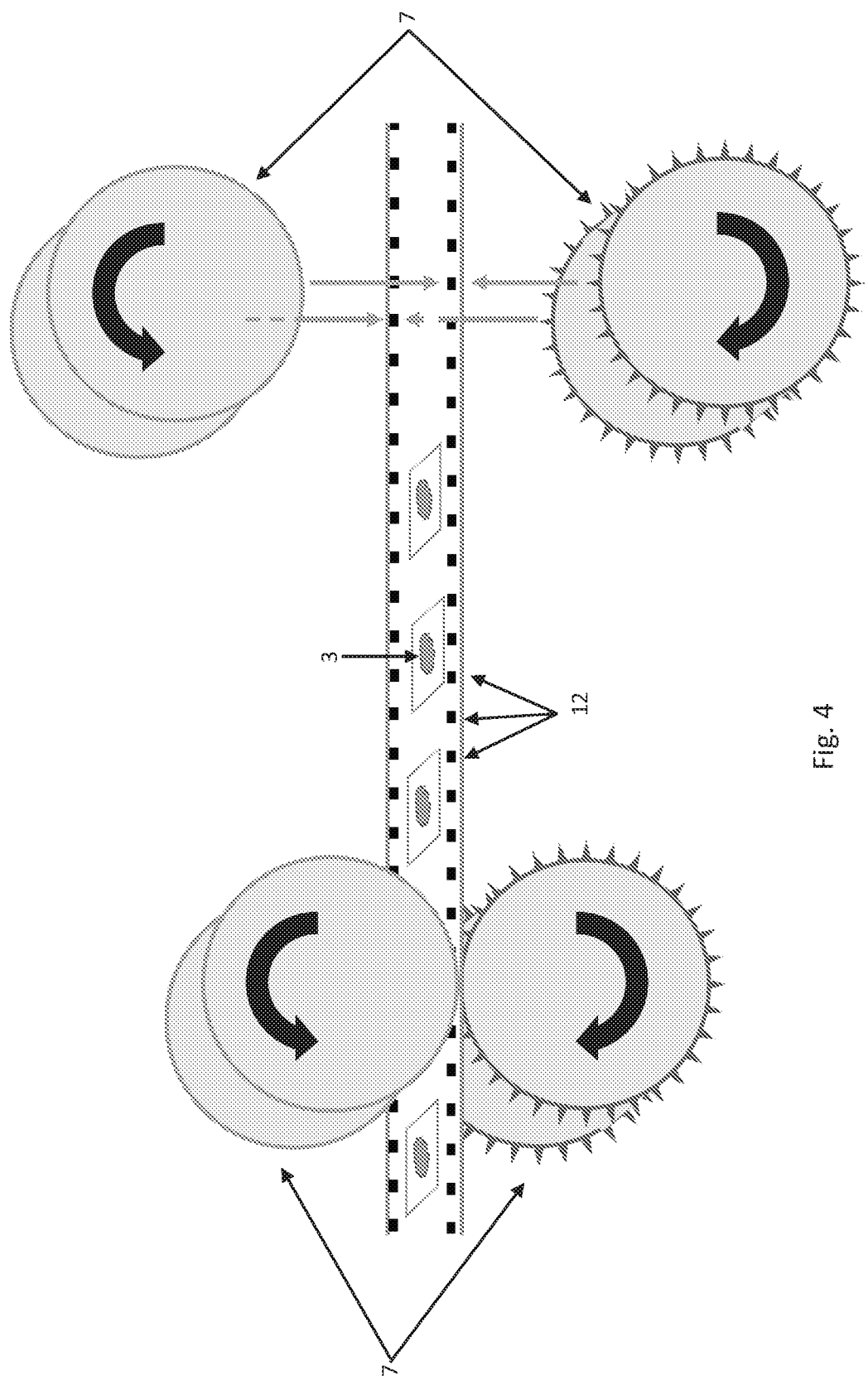
FIG. 4 is a diagram that depicts a mechanism for maintaining precise control of the positioning for the film while moving throughout the device.

FIG. 4 is a diagram depicting a mechanism for maintaining precise control of the positioning of the tissue sample sections 3 while being transported between modules on the film 5. Equidistant holes 12 along the lateral edges of the film 5 line up with cogs on the sprockets. The rotation of all sprockets throughout the device are coordinated such that the position of all sample sections 3 is defined precisely and accurately.

Figure 5:
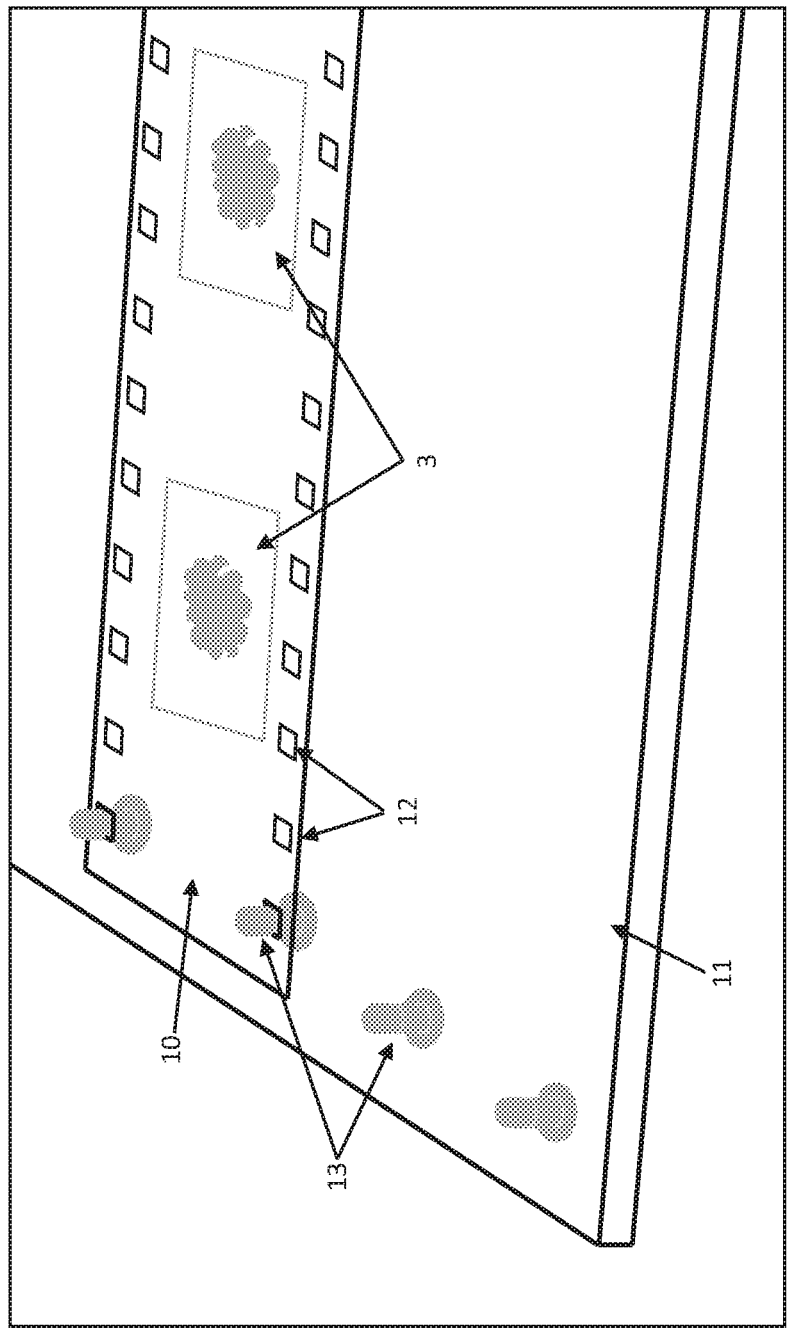
FIG. 5 shows how the strips are mounted onto the plate.

FIG. 5 shows how the strips of film 10 can be mounted on a plate 11. In this embodiment of the invention, the mounting plate 11 is designed with protrusions or pegs 13 extending through the plate 11, orthogonal to its mounting surface. These pegs 13 are positioned along opposite lateral edges of the plate and spaced as to align with the holes 12 in the film strips 10. This design provides discrete and consistent placement of the strips 10, optimizing the mounting area and, in certain embodiments of the invention, aiding in scanning and staining (not shown).

Figure 6:
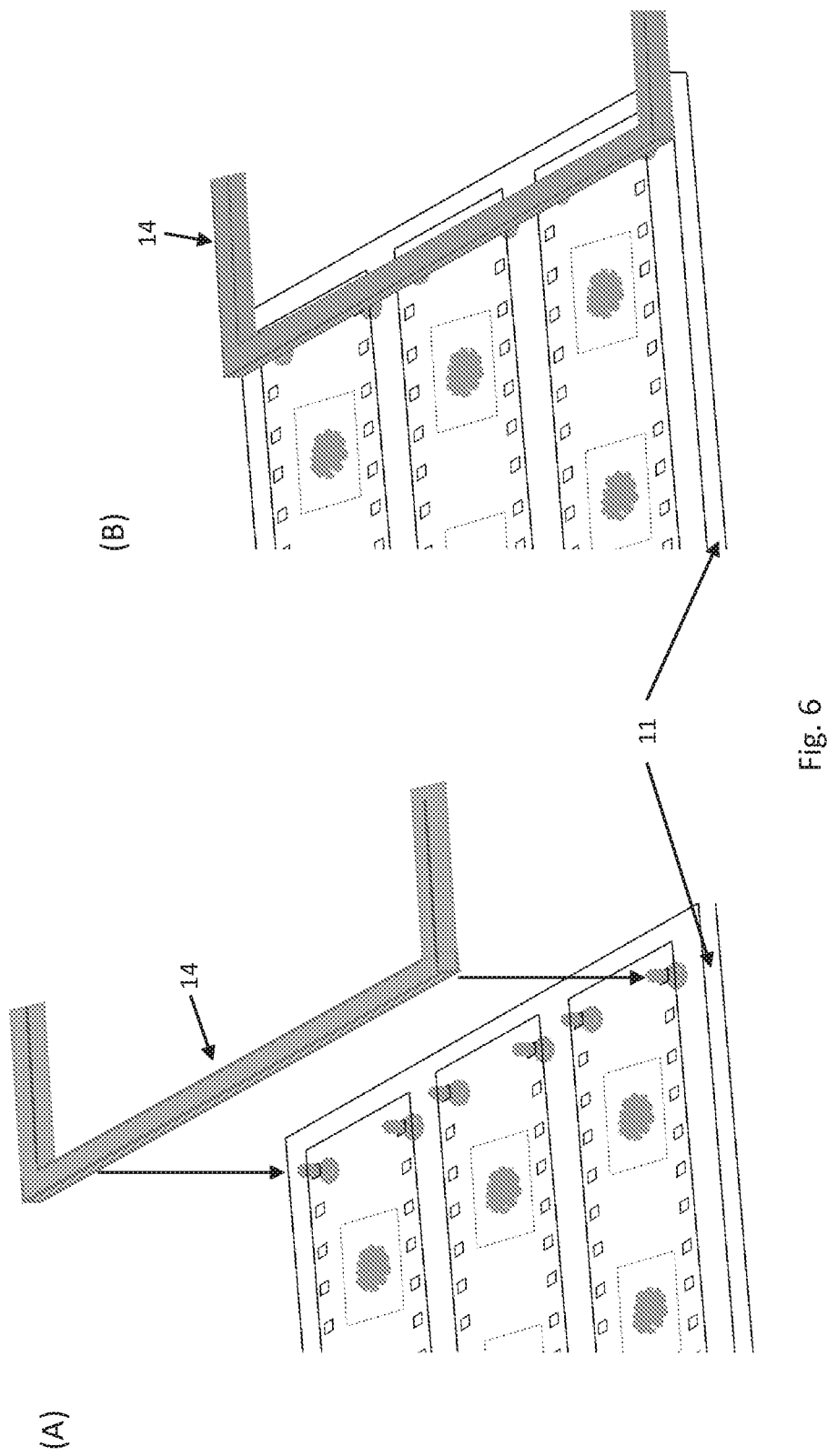
FIG. 6 shows how the strips are locked into position on the plate once the plate is full. 7 is a diagram that depicts a design enabling continuous processing of samples on a single ribbon of film.

FIG. 6 shows an additional safety measure to prevent movement of plate-mounted strips 10 during processing. A mechanized lock-bar or clamp 14 can be lowered onto the pegs 13 on the plate 11.

Figure 7:
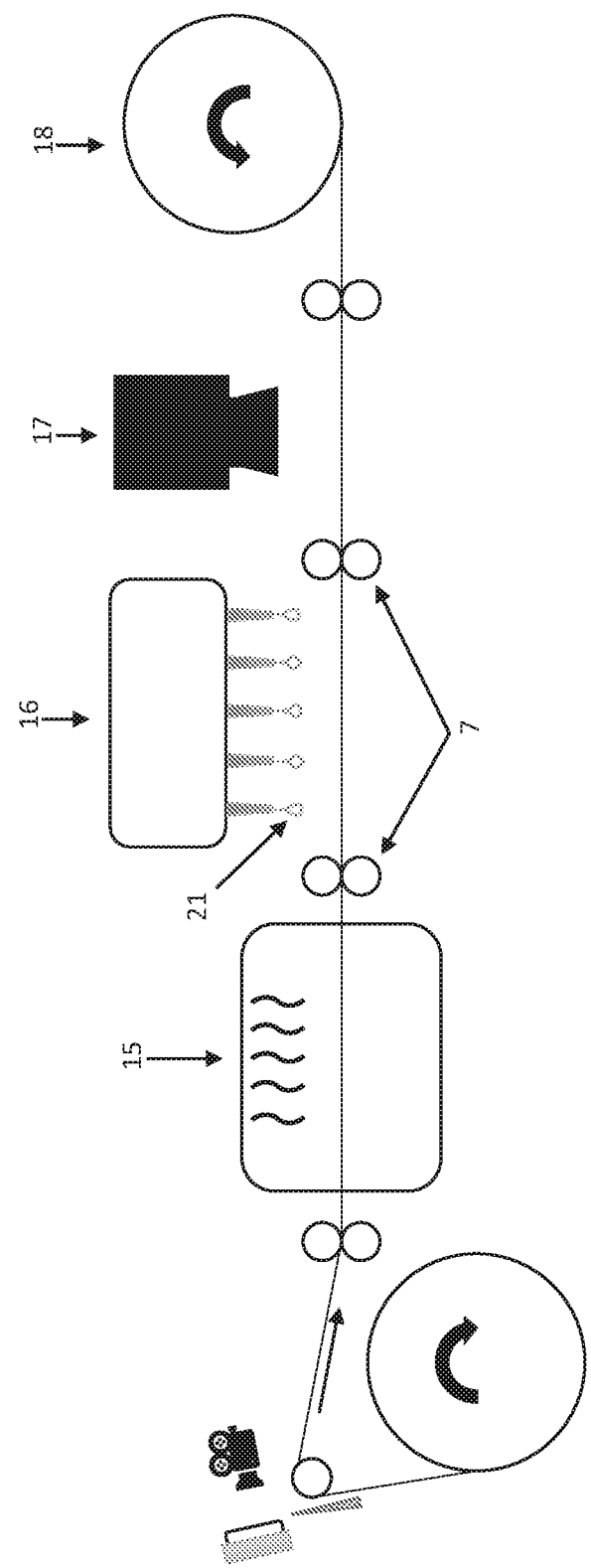

FIG. 7 is a diagram of one embodiment of the present invention in which a single, continuous ribbon of film transports sample sections sequentially between processing modules. The sample is first sectioned and transferred onto the carder film, as described in FIG. 1. Rather than being cut into strips, the embodiment depicted here shows the film and the mounted sample sections (not shown) moving along in a conveyer belt fashion through the deparaffinization 15, staining 16, sealing, and scanning 17 modules. Once processed, the film is rolled into a storage spool 18. The deparaffinization module 15 serves to heat each sample and melt the paraffin wax. Due to the design of this embodiment, the deparaffinization module 15 may be designed as a corridor lined with heating elements. Chemical washes are generally used for deparaffinization as well, however, these reagents can be incorporated into and applied by the staining module. The staining module 16 depicted here is an auto-dispenser design that applies staining reagents 21 to individual sample sections (see FIG. 8A). The sealing module for this embodiment (not shown) applies droplets 21 of liquid sealant onto each sample; this system can also be incorporated into and applied by the staining module, given the similar mechanism. The scanning module 17 serves to capture a digital image of each sample. There are a variety of possible embodiments of this module (see DETAILED DESCRIPTION: Modular Component); the version used with this embodiment of the invention could take high-resolution images of sample consecutively as they pass within the field of view of the camera. Movement of carrier film and positioning of the samples within each module could be controlled by high-precision sprockets 7.

Figure 8:
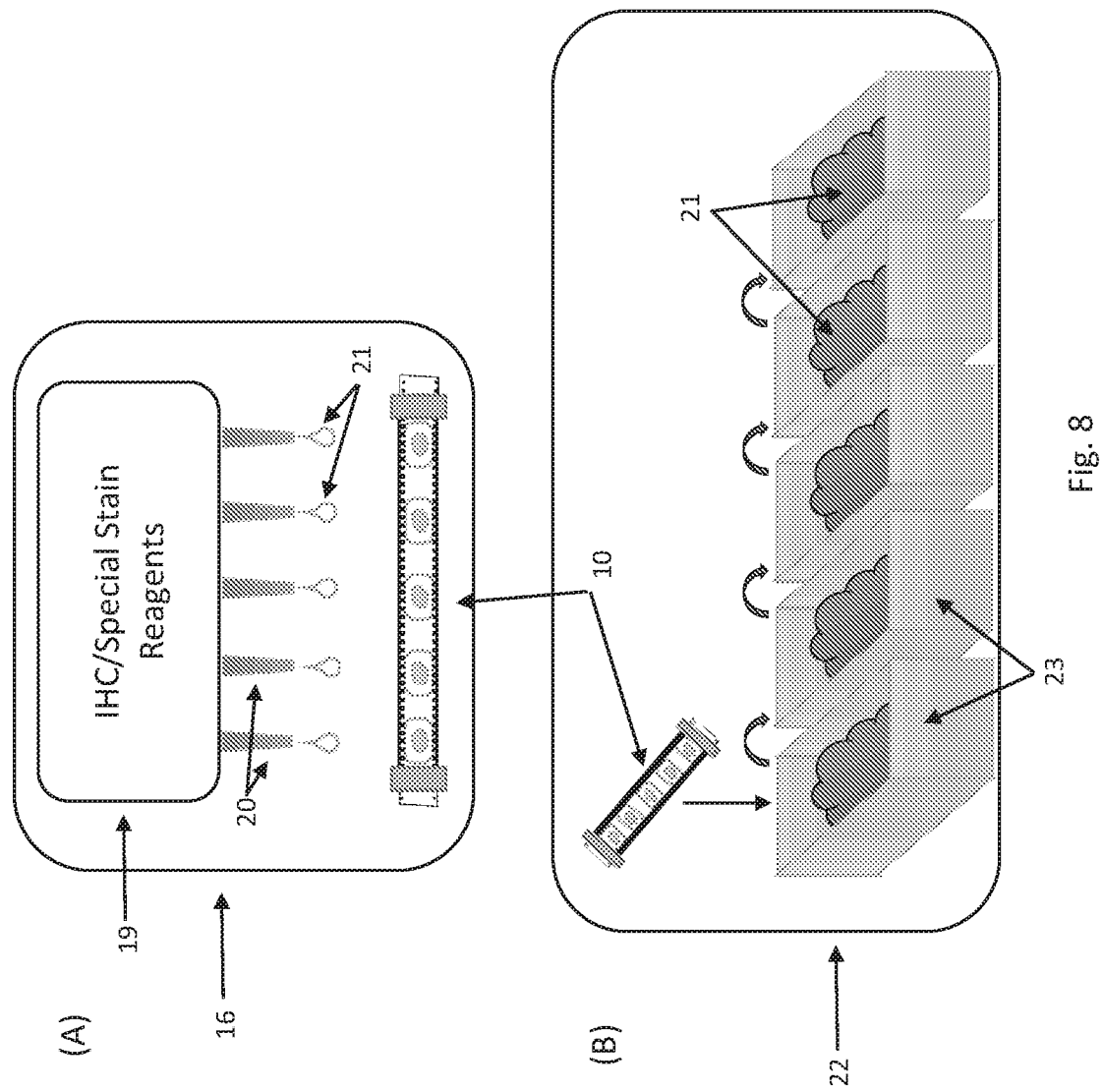
FIG. 8 shows diagrams of two staining modules variants.

FIG. 8 shows two possible embodiments of the staining module. Panel (A) show the automated dispenser design 16. In this design, automated applicators 20, as pipettes or nozzles, drip the particular staining reagents 21 on the specific samples, depicted here on a strip of film 10. The staining reagents, as well as the deparaffinization reagents and liquid sealant, could be stored separately in tanks within the body of the module 19. A discrete and relatively small volume of reagent could be applied to each sample in an effort to reduce cost and waste. A chamber or barrier (not shown) could be placed around individual samples to prevent sample runoff and cross-contamination. This variant of the module could be designed with a plurality of applicators 20 capable of dispensing multiple reagents 21 and processing multiple samples simultaneously, as well as variable staining between adjacent sections. The automated applicator staining module variant 16 is depicted here processing an isolated strip 10. However, this design can be integrated into most embodiments of the invention; this design would not be suitable while using the processing spiral (see DETAILED DESCRIPTION: Modular Component).

Panel (B) shows a reagent bath design 22. This the variant, samples are submerged and incubated in a series of liquid reagents baths 23, as required for the desired staining protocol. This figure depicts an isolated strip being processed; however, this variant is well suited for collective sample staining using the section mounting plate 11, either with use of the film strips (FIG. 1) or direct section mounting (not shown), and the processing spiral (FIG. 9).

Figure 9:
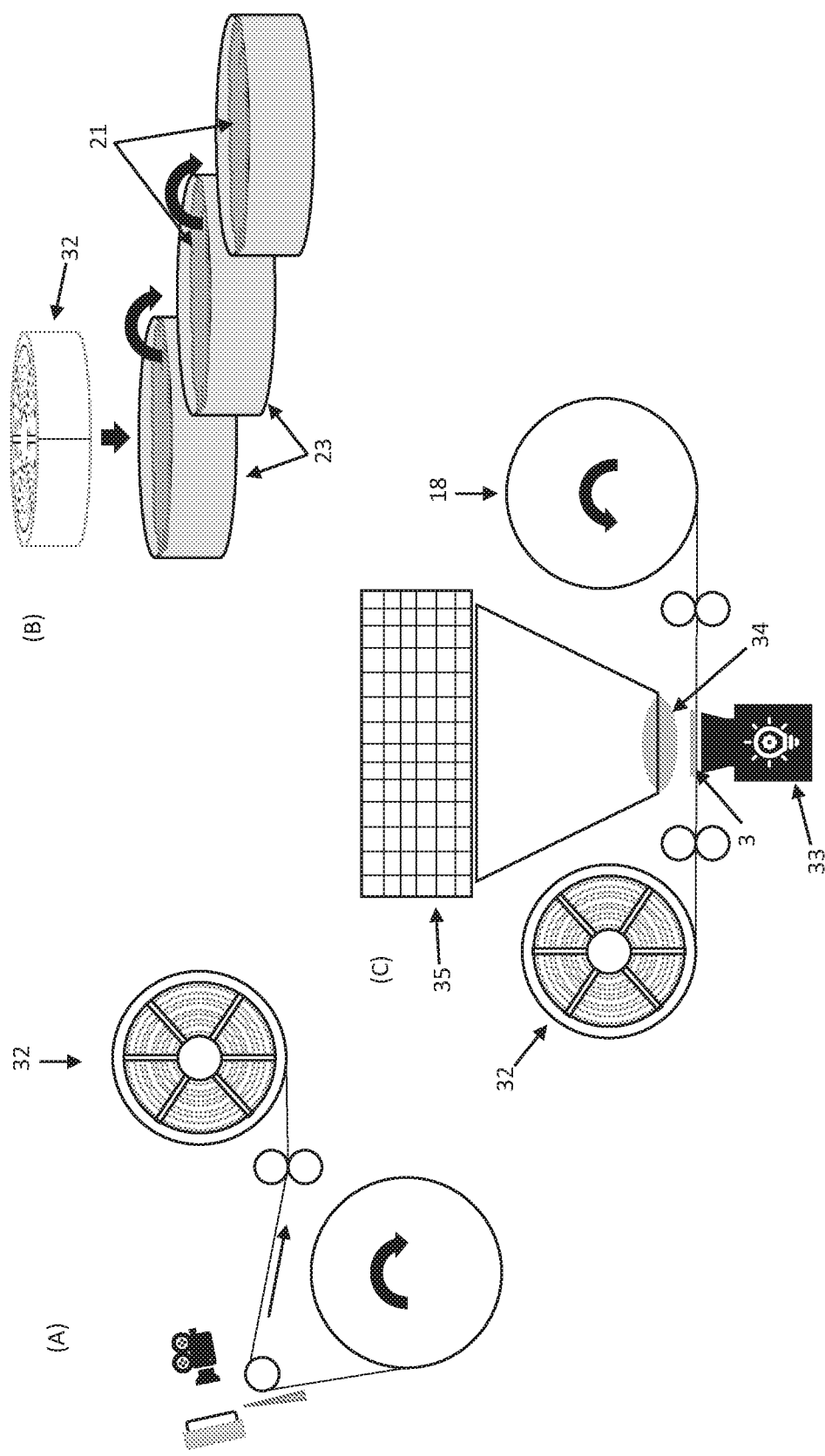
FIG. 9 shows an alternate design of the continuous processing model. Panel (A) shows the film being rolled into a staining spiral once sections are mounted. Panel (B) shows the reagent bath staining module. Panel (C) shows a scanning module that amplifies the analog image prior to digital scanning, as well as storage.

FIG. 9 shows an alternate embodiment for single-ribbon, continuous processing. Similarly to the continuous process depicted in FIG. 7, the sample sections are transferred and processed on the carrier film. However; as seen in panel (A), the film and sample sections are rolled into a staining spiral 32. This spiral is designed to contain the full length of a completely sectioned tissue sample block 1, while maintaining space between layers of the rolled film. Once an entire sample is sectioned and transitioned into the spiral, this film is cut (not shown), and the spiral continues to processing: deparaffinization (not shown), staining using the reagent bath variant module 22 (panel (B)), sealing (not shown), scanning (panel (C)), storage 18. One embodiment of the scanning module 17, depicted in Panel (C), shows the analog image of the sample being amplified prior to image capture. A projector 33 positioned beneath the now stained sample section 3, projects the analog image of the sample through a plurality of lenses 34. These lenses amplify and focus the image into a high-resolution, polychromatic, digital detector array 35. In this diagram, images from each sample are collected sequentially and continuously, however, this scanning module variant can be utilized in all embodiments of the present invention. Once scanned, samples are transferring into a storage spool 18.

Figure 10:
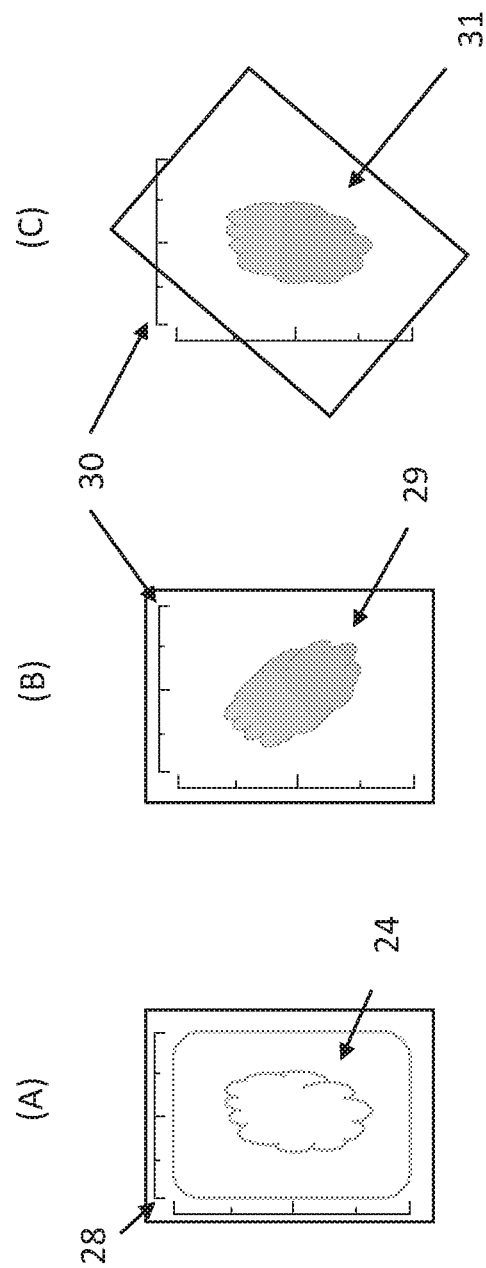
FIG. 10 displays a quality control method for rotational error correction when scanning by use of a reference scan. Panel (A) depicts a reference image Panel (B) shows the same sample slice post-processing with an error. Panel (C) shows the corrected image of the same sample slice.

FIG. 10 displays a method of quality control implemented prior to 3D image reconstruction. As seen in FIG. 1, a camera 4 is present and directed at the block face 24; this captures an image of the block face 24 prior to each cut. This reference image is saved. Observable within this reference image (panel (A)) is a scale or marking of known dimensions 28. This scale can be positioned on the microtome cradle or the sample cassette. Panel (B) shows the image of the same sample slice post-processing, as seen by the high-resolution scanner 29; this sample has undergone an unintended rotation in this figure. The scales 30 in this panel represent a virtual scale overlaid by the reconstruction software. The reference image and scale 28 are compared to the virtual image 29 and scale 30 to determine unintended alterations to sample position, rotation, and morphology. After determining the error, if any; the software can apply a correction to the high-resolution image, as seen in panel (C). The corrected image 31 is saved and incorporated into 3D reconstruction.

FIGURE LEGEND

1. Formalin Fixed Paraffin Embedded (FFPE) Biological Tissue Sample
2. Microtome Blade
3. Tissue Sample Section
4. Low Resolution Camera
5. Carrier Film
6. Film Spool
7. Sprockets
8. Clamps
9. Cutting Blade
10. Strip of Film
11. Mounting Plate
12. Holes in Film
13. Pegs
14. Lock-bar
15. Deparaffinization Module
16. Automated Staining Reagent Dispenser Module
17. High Resolution Camera
18. Storage Spool
19. Staining Reagent Tanks
20. Automated Dispenser Nozzles
21. Staining Reagents
22. Automated Staining Reagent Bath Module
23. Staining Reagent Baths
24. Block Face
25. Direction of Motion of Block
26. Aqueous Spray
27. Direction of Motion of Blade
28. Reference Scale Bar
29. High Resolution Image of Processed. Sample
30. Virtual Reference Scale Bar
31. Corrected High Resolution Image of Processed Sample 32. Processing Spiral
33. Projector
34. Lens or Series of Lenses
35. Detector Example 1

A FFPE tissue sample is manually inserted into the cradle of the microtome of the sectioning apparatus. Continuous sectioning is conducted while sample sections are transferred onto a carrier film, as described. Sample sections are transferred from the carrier film onto a mounting plate by aid of CNC; samples are transferred consecutively by cutting order such that the position of each sample on the plate is bound within a known region of the plate. The plate and all mounted samples are transferred to a deparaffinization module, designed as an insulated oven. The plate is then transferred to an H&E reagent bath staining module. A coverslip is applied to the plate. A scanning module; comprising one high-resolution camera capable of scanning the entire plate, captures one high-resolution image. The plate is removed from the device and put into storage. Using the software algorithm, the high-resolution image is divided into regions each containing only one sample section; a new data set is saved such that each file is an image of a single section. The images are numbered and put into order. All sample images undergo quality control and correct of translational, rotational, and/or morphological errors; new image files are generated as needed. The image data set is used to reconstruct a three-dimensional model. This reconstruction is analyzed via AI and machine learning algorithms to aid is disease diagnosis and tissue sample presentation.

Example 2

A FFPE tissue sample is manually inserted into the cradle of the microtome of the sectioning apparatus. Continuous sectioning is conducted while sample sections are transferred onto a carrier film, as described. The carrier film is rolled into the processing spiral. Once the entire tissue block is sectioned, and all samples are contained in the spiral, the film is cut. The spiral and its contents are transferred to a deparaffinization module, designed as an insulated oven. The plate is then transferred to an H&E reagent bath staining module. Once stained, the film is unwound from the spiral with the help of sprockets. A sealing module can apply a drop of liquid sealant to each sample. A scanning module, comprising a projector, series of lenses, and a high-resolution, polychromatic, digital detector array, amplifies the analog image of a single slice and focuses that image into the sensor. Samples are scanned consecutively as they are unwound from the spool. Once scanned the film is rolled into a storage spool. The high resolution images should be in reverse order. All sample images undergo quality control, correcting for translational, rotational, and/or morphological errors; new image files are generated as needed. The image data set is used to reconstruct a three-dimensional model. This reconstruction is analyzed via AI and machine learning algorithms to aid is disease diagnosis and tissue sample presentation.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed. To the extent a definition of a term set out in a document incorporated herein by reference conflicts with the definition of a term explicitly defined herein, the definition set out herein controls.

What is claimed is:

1. A method for processing a biological sample, comprising:
    transferring a plurality of slices cut from the biological sample to a collecting film, the plurality of slices being transferred sequentially onto the collecting film;
    spooling, at least while the plurality of slices are being transferred to the collecting film, the collecting film to form a rolled collecting film, the rolled collecting film having a plurality of rolled layers, each rolled layer of the plurality of rolled layers comprising a portion of the collecting film and a portion of the plurality of slices;
    staining the plurality of slices collectively while the plurality of slices are positioned on the rolled collecting film;
    unwinding the rolled collecting film; and
    imaging the plurality of slices on the collecting film.

2. The method of claim 1, wherein the biological sample is a formalin-fixed, paraffin-embedded (FFPE) tissue.

3. The method of claim 2, further comprising deparaffinizing the plurality of slices.

4. The method of claim 3, wherein deparaffinizing the plurality of slices comprises deparaffinizing the plurality of slices collectively while the plurality of slices are positioned on the rolled collecting film.

5. The method of claim 1, wherein the imaging further comprises imaging each slice of the plurality of slices at a speed of between 10 slices per minute to 60 slices per minute.

6. The method of claim 1, wherein the plurality of slices are juxtaposed on a surface of the collecting film that follows a cutting order of the plurality of slices.

7. The method of claim 1, wherein staining the plurality of slices comprises submerging the rolled collecting film in a reagent bath.

8. The method of claim 7, wherein spooling the collecting film comprises winding the collected film onto a staining spiral to form to the rolled collecting film, and wherein the staining spiral is submerged with the rolled collecting film in a reagent bath.

9. The method of claim 1, further comprising, rolling the collecting film with the plurality of slices onto a storage spool.

10. The method of claim 9, further comprising, subsequent to unwinding the rolled collecting film and before rolling the collecting film with the plurality of slices onto a storage spool, applying a sealant to the plurality of slices.

11. The method of claim 9, further comprising applying a cover to the plurality of slices on the collecting film before rolling the collecting film with the plurality of slices onto a storage spool.

12. The method of claim 1, wherein unwinding the rolled collecting film includes positioning the collecting film for a plurality of equidistantly spaced holes along a pair of opposing lateral edges of the collecting film to sequentially receive a portion of a sprocket as the collecting film is displaced to at least a location at which the imaging is conducted.

13. The method of claim 1, further comprising cutting the biological sample into a plurality of slices with equal thickness.

14. The method of claim 1, further comprising amplifying an analog image of each slice of the plurality of slices prior to imaging of the slice, the analog image comprising a high-resolution, polychromatic array.

15. The method of claim 1, further comprising
    rerolling, following imaging of the plurality of slices, the collecting film containing the plurality of slices onto a spool.

16. The method of claim 1, wherein imaging the plurality of slices on the collecting film occurs during the unwinding of the rolled collecting film.

17. The method of claim 1, wherein the imaging is conducted individually for each slice of the plurality of slices at a time when moving the collecting film through the imaging device.

18. The method of claim 1, wherein for each slice of the plurality of slices the imaging device captures a single image comprising an entirety of the slice.

19. The method of claim 1, wherein spooling further comprises separating each rolled layer of the plurality of rolled layers from an adjacent rolled layer by a space.

\* \* \* \* \*